United States Patent [19]

Ference et al.

[11] 4,130,680

[45] Dec. 19, 1978

[54] STRONG, LIGHTWEIGHT PHOTOSENSITIVE LAMINATE

[75] Inventors: Joseph Ference; John E. Megles, Jr., both of Corning, N.Y.

[73] Assignee: Corning Glass Works, Corning, N.Y.

[21] Appl. No.: 822,879

[22] Filed: Aug. 8, 1977

[51] Int. Cl.$^2$ .................. C03C 3/26; B32B 17/00
[52] U.S. Cl. .................. 428/68; 65/30 R; 65/DIG. 2; 106/DIG. 6; 156/89; 156/100; 156/272; 427/43; 427/54; 428/210; 428/213; 428/410; 428/434; 428/428; 428/913
[58] Field of Search ............... 428/68, 428, 913, 210, 428/213, 410, 434; 65/DIG. 2, 30 R, DIG. 9; 106/DIG. 6, 52; 427/43, 54; 156/100, 89, 272

[56] References Cited

U.S. PATENT DOCUMENTS

| | | | |
|---|---|---|---|
| 3,673,049 | 6/1972 | Giffen | 428/428 |
| 3,801,336 | 4/1974 | Upton | 65/DIG. 2 |
| 3,892,904 | 7/1975 | Tanaka | 428/210 |
| 3,966,311 | 6/1976 | Korn | 65/DIG. 2 |
| 4,009,318 | 2/1977 | Elmer | 428/428 |
| 4,017,292 | 4/1977 | Mann | 65/DIG. 2 |
| 4,017,318 | 4/1977 | Pierson | 106/52 |
| 4,076,542 | 2/1978 | Deeg | 65/30 R |

*Primary Examiner*—Ellis Robinson
*Attorney, Agent, or Firm*—Kees van der Sterre; Clinton S. Janes, Jr.; Clarence R. Patty, Jr.

[57] ABSTRACT

Photosensitive laminated glass useful for providing strong, lightweight glass articles incorporating integral surface decorations resistant to mechanical and chemical deterioration in use are described.

8 Claims, 2 Drawing Figures

STRONG, LIGHTWEIGHT PHOTOSENSITIVE LAMINATE

BACKGROUND OF THE INVENTION

The present invention relates to laminated glassware and is primarily concerned with the manufacture of strong, lightweight glass articles comprising color decorations which are useful for tableware, for lighting, and for other applications utilizing decorated glass.

U.S. Pat. No. 3,673,049 to Giffen et al. discloses a laminated glass body comprising a tensilely stressed core portion and an adherent, compressively stressed surface layer substantially enveloping the core portion, made by a continuous hot-forming process. Such laminates are useful for the production of strong, lightweight dinnerware and the like, the compressive stresses therein rendering the laminates highly resistant to mechanical breakage.

The decoration of laminates such as described in the aforementioned Giffen et al. patent is presently accomplished by means conventional for dinnerware, e.g., through the use of ceramic decals or similar decorating media which permit the application of color designs to the outer surfaces of the laminates. Such conventional decorations are subject to mechanical and chemical attack in use; thus special glazing compositions and high temperature firing treatments are utilized to insure adequate service life.

Although integrally colored glasses have been used to provide decorative glass and ceramic ware of high durability, the use of colored glass is not a very flexible design technique, particularly where large quantities of ware having different designs are to be produced. For this purpose, design methods permitting the application of any one of a large number of different designs to a single product or a small number of related products are preferred.

Very recently, photosensitive glasses which can be treated in the solid state to impart integral coloration over an extremely wide range of colors have been discovered. Hence U.S. Pat. No. 4,017,318 to Pierson and Stookey discloses photosensitive glasses containing silver, alkali metal oxides, fluorine, at least one of chlorine, bromine and iodine and, optionally, $CeO_2$, which glasses can be treated utilizing a sequence of high energy radiation and heating steps to produce integral coloration therein. Thus multi-colored photographs and other decorative designs can be developed in these glasses with a great deal of design flexibility.

The production of strong, lightweight glass articles from photosensitive glasses such as described in the aforementioned patent is difficult. The colors developed in such glasses are modified by exposure to high temperatures, such that air tempering and other strengthening methods involving heating have only limited utility. Similarly, the development of color in such glass requires treatment at elevated temperatures such that tempered or otherwise strengthened ware cannot subsequently be decorated without loss of strength.

It is the principal object of the present invention to provide a strong, lightweight glass article comprising photosensitive glass which can be decorated without reducing the mechanical strength thereof.

It is a further object of the invention to provide a strong, lightweight glass article comprising integrally colored photosensitive glass.

Other objects and advantages of the invention will become apparent from the following detailed description thereof.

SUMMARY OF THE INVENTION

In accordance with the present invention there is provided an integrally colored, laminated glass article consisting of a tensilely stressed core layer composed of a spontaneous fluoride opal core glass and a compressively stressed surface layer fused to and substantially enveloping said core layer composed of a photosensitive surface layer glass. The surface layer glass includes at least one integrally colored region containing microcrystals of alkali metal fluoride together with a coloring metallic silver phase.

The core glass of the laminate of the invention is of alkali aluminosilicate composition, having an average linear coefficient of thermal expansion (0°–300° C.) of at least about $75 \times 10^{-7}/°$ C., and is essentially free of the alkali metal oxide $Li_2O$. The average linear coefficient of thermal expansion of the surface layer glass (0°–300° C.) is at least about $10 \times 10^{-7}/°$ C. less than that of the core glass, and the thickness of the surface layer is at least about 0.002 inches. The ratio of the thickness of the core layer to the thickness of the surface layer is at least about 8:1.

The surface layer glass of the laminate contains at least about 0.01% silver by weight, and the integrally colored region of the surface layer contains microcrystals of alkali metal flouride in a concentration of at least about 0.005% by volume. This region further contains, as the coloring phase, discrete colloidal particles of metallic silver less than about 200Å in the smallest dimension, and/or metallic silver contained within at least a portion of said alkali metal fluoride microcrystals, said silvercontaining portion of the microcrystals being less than about 200Å in the smallest dimension, and/or a coating of metallic silver on at least a portion of the surface of the alkali metal fluoride microcrystals, the portion of the microcrystals coated with silver being less than about 200Å in the smallest dimension.

The method of forming a laminated decorated glass article in accordance with the invention broadly comprises, first, providing a melt of an alkali aluminosilicate core glass and adjusting the viscosity of the melt to a value suitable for lamination. The core glass selected for melting must be essentially free of $Li_2O$ and possess the thermal expansion characteristics specified above.

A second melt of a photosensitive surface layer glass having a viscosity suitable for lamination is also provided, the glass selected for melting containing at least about 0.01% of silver by weight and having the thermal expansion characteristics hereinabove set forth. The first and second melts are then combined into laminated sheet consisting of a photosensitive surface layer and an alkali aluminosilicate core, and this sheet is then shaped to provide a laminated glass article wherein the surface layer is at least about 0.002 inches in thickness and the ratio of core thickness to surface layer thickness is at least about 8:1. The core spontaneously transforms to white opal glass as the shaped article is cooled after forming.

Finally, selected regions of the photosenstive surface layer are developed to provide integrally colored regions containing alkali metal fluoride crystals and metallic silver as hereinabove described. The colors of the regions selected for development are controlled in the known manner by varying the irradiation and heating treatments used in the development process.

A laminated glass article such as described exhibits high strength even in thin cross-section, and is thus mechanically durable. The surface layer glass demonstrates good photosensitivity such that strongly saturated colors may be developed therein by conventional color development techniques. The opal core, which is typically opaque and white in color, provides an excellent background for color decorations developed in the photosensitive surface layer, and the decorations so developed, being present within the bulk of the surface layer glass, are not subject to deterioration in use. Thus the problem of toxic metal release is avoided and a strong, durable, decorated glass article is provided.

DESCRIPTION OF THE DRAWING

The invention may be further understood by reference to the drawing wherein.

DETAILED DESCRIPTION

Figure 1:
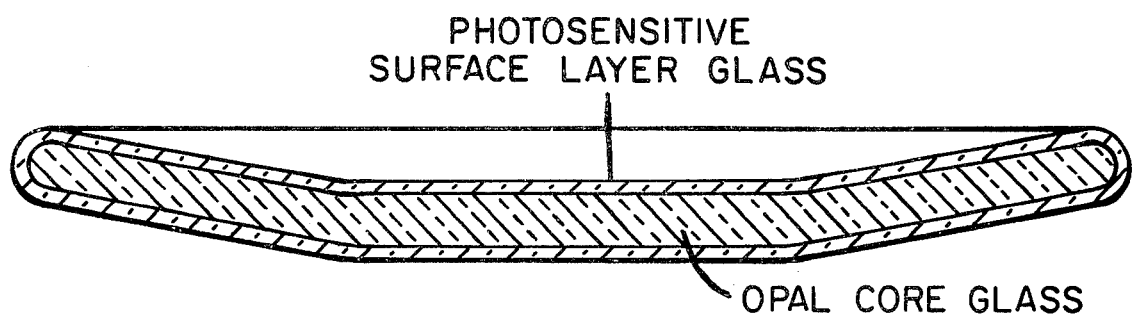
FIG. 1 consists of an enlarged diagrammatic elevational view in cross-section of a laminated glass article, i.e., a laminated plate, provided in accordance with the invention. The dimensions of the designated photosensitive surface layer glass and the designated opal core glass are not drawn to scale or shown in true proportion, but the relative positions of the core and surface layer in a typical article are illustrated.
Figure 2:
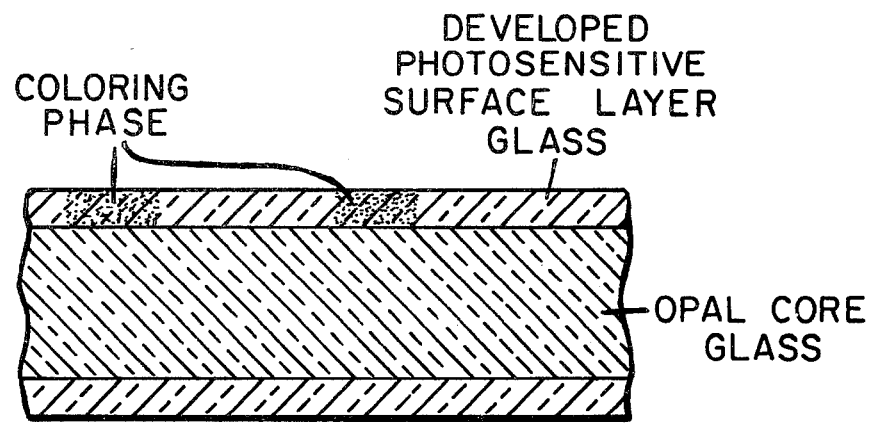
FIG. 2 is a further enlarged partial diagrammatic elevational view in cross-section of a laminated article such as shown in FIG. 1, wherein the coloring phase giving rise to integral coloration in the developed photosensitive surface layer is schematically depicted as a multiplicity of discrete particles.

In selecting glass to be utilized for the core of the laminated article of the invention, it is important that the requirements of spontaneous opacity and a moderately high thermal expansion coefficient be observed. The so-called heat-treated opal glasses, i.e., glasses which do not develop opacity on forming from the melt but are instead heated subsequent to forming in order to develop opacity, are not good core materials for the present purpose because the temperatures required for developing a suitable level of opacity therein undesirably affect the color and/or photosensitivity of the surface layer glass.

Low thermal expansion in the core glass leads to laminated articles exhibiting low strength. Thus a core glass exhibiting an average linear coefficient of thermal expansion over the temperature range 0°–300° C. of at least about $75 \times 10^{-7}/°$ C. is required. Core glasses having expansions in the range of about $85\text{–}95 \times 10^{-7}/°$ C. provide the best combination of strength and laminate fracture characteristics when laminated to the photosensitive surface layer glasses hereinafter described.

It is also important that the core glass be essentially free of lithium oxide. Although $Li_2O$ is a desirable component in some spontaneous opal composition systems, we have found that lithium can migrate from the core glass into the photosensitive surface layer glass during formation of the laminate. This lithium then acts to substantially degrade the photosensitivity of the surface layer glass, such that the capability of the surface layer glass to develop intense colors upon subsequent treatment is considerably impaired.

Spontaneous opal core glasses exhibiting the properties necessary for use in the laminate may be selected from a rather wide range of alkali aluminosilicate composition. Preferably, however, the core glass is one having a composition comprising in weight percent as calculated from the batch, about 57–76% $SiO_2$, 5–11% $Al_2O_3$, 5–17% $Na_2O$, 0–3% $K_2O$, and 4–10% F.

Examples of spontaneous opal glasses suitable for use as core glasses for the laminate are set forth in Table I below. Such glasses may be melted in accordance with normal glass-melting practice, being suitably compounded from batches composed of conventional glass batch constituents which are converted to the designated oxide or other glass constituents at the temperatures used for melting the batch. The molten glass thus provided may then be incorporated into a laminate by combining with photosensitive surface layer glass at viscosities in the range of about 400–4000 poises in accordance with known methods.

The compositions reported in Table I are reported in parts by weight on the oxide basis as calculated from the batch, except for fluorine which is reported in parts by weight on the elemental basis in the usual manner. Also reported in Table I are average linear coefficient of thermal expansion values for each of the glasses, as measured over the temperature range 0°–300° C.

TABLE I

|  | 1 | 2 | 3 | 4 | 5 | 6 | 7 | 8 |
|---|---|---|---|---|---|---|---|---|
| $SiO_2$ | 65.0 | 75.7 | 60.2 | 57 | 62 | 64.1 | 63.7 | 61 |
| $Al_2O_3$ | 6.1 | 6.23 | 10.4 | 5.9 | 6.2 | 8.0 | 6.8 | 5.0 |
| $Na_2O$ | 5.0 | 16.37 | 8.45 | 11.6 | 12.6 | 9.9 | 12.5 | 14 |
| $K_2O$ | 1.9 | 1.25 | 2.15 | 1.0 | — | — | 1.6 | — |
| F | 6.1 | 4.57 | 4.3 | — | 7.8 | 8.0 | 7.3 | 9.7 |
| $B_2O_3$ | — | — | 1.4 | 2.4 | 11.4 | — | — | — |
| CaO | 15.7 | 0.17 | 4.7 | — | — | 8.1 | 10.8 | 14.3 |
| ZnO | — | — | 9.8 | — | — | — | — | — |
| BaO | — | — | — | 14.2 | — | — | — | — |
| $P_2O_5$ | — | — | — | 7.9 | — | — | — | — |
| Thermal Expansion Coefficient ($\times 10^{-7}/°$ C) | 80 | 94 | 83 | 88 | 101 | 98 | 98 | 104 |

The importance of the hereinabove described limitations relating to core composition and thermal expansion is demonstrated by further composition examples given in Table IA below, also reported in parts by weight:

TABLE IA

|  | A | B | C |
|---|---|---|---|
| $SiO_2$ | 72.8 | 58 | 65.2 |
| $Al_2O_3$ | 3.6 | 18.4 | 7.9 |
| $Na_2O$ | 6.6 | 10.0 | 4.8 |
| $K_2O$ | 10.1 | — | — |
| $Li_2O$ | 2.1 | — | — |
| F | 4.7 | 4.0 | 5.9 |
| $B_2O_3$ | — | 0.3 | — |
| ZnO | — | 8.0 | 9.4 |
| CaO | — | 0.9 | 6.5 |
| MgO | — | 0.4 | — |

The glasses in Table IA are not suitable for use in the laminate of the invention. Example A of Table IA is a spontaneous opal glass which is found to deleteriously affect the photosensitivity of surface layer glasses with which it is combined, due to the presence of $Li_2O$ therein. Example B is an opal glass which disadvantageously requires a heat treatment subsequent to forming, in order to develop sufficient opacity for use, while Example C is a spontaneous opal glass having an average linear coefficient of thermal expansion of about $59 \times 10^{-7}/°$ C., a value too low for use in the invention.

The composition of the photosensitive glass utilized to provide the surface layer of the laminate is also an important variable affecting the physical properties of the laminate and the decorating characteristics thereof. For reasons relating to the effects of lamination on photosensitivity and/or the relatively thin surface layer which is employed, many compositions which produce good coloration in bulk form do not perform adequately as the laminate surface layer.

The amount of silver present in the surface layer glass is a particularly important variable from the standpoint of color development. Hence, in addition to the essential photosensitizing constituents fluorine, the alkali metal oxides, and at least one of chlorine, bromine and iodine, the glass must contain at least about 0.01% Ag by weight in order to exhibit the degree of photosensitivity required.

The combined requirements of good photosensitivity and low thermal expansion dictate a preferred range of surface layer glass composition which includes glasses consisting essentially, in weight percent as calculated from the batch, of about 68–74% $SiO_2$, 14–18% $Na_2O$, 4–10% $Al_2O_3$, 3–9% ZnO, 1.8–6% F, 0.1–2.5% Br, 0.01–0.05% Ag, 0.01–0.10% $CeO_2$, 0.05–3.0% $Sb_2O_3$, and 0.04–0.2% SnO. The presence of $CeO_2$ in these compositions is specified because ultraviolet radiation is the high energy radiation of choice for developing decorations in the surface layer of the laminate.

Glasses within the above-described composition range may be compounded utilizing conventional glass batch constituents, including oxides or other compounds which will be converted to the specified oxides or elements at the temperatures utilized for melting the batch, and may be melted in suitable melting units at ordinary temperatures. They may then be incorporated into laminated articles by combining at viscosities in the range of about 700–3000 poises with spontaneous opal core glasses as hereinabove described.

Examples of photosensitive glass compositions suitable for use in the invention are reported in Table II below. The compositions are reported in parts by weight on the oxide basis as calculated from the batch, except for silver and the halogens which are reported on an elemental basis in accordance with conventional practice. Also reported in Table II are average linear coefficients of thermal expansion over the temperature range 0°–300° C., where determined on individual samples.

TABLE II

|  | 9 | 10 | 11 |
|---|---|---|---|
| $SiO_2$ | 72.0 | 72.0 | 72.0 |
| $Na_2O$ | 16.2 | 16.2 | 16.2 |
| $Al_2O_3$ | 6.9 | 6.9 | 6.8 |
| ZnO | 5.0 | 5.0 | 5.0 |
| F | 2.5 | 2.6 | 2.6 |
| Br | 1.1 | 1.1 | 0.8 |
| Ag | 0.01 | 0.02 | 0.03 |
| $CeO_2$ | 0.05 | 0.10 | 0.10 |
| $Sb_2O_3$ | 0.2 | 1.0 | 0.30 |
| SnO | 0.05 | 0.08 | 0.20 |
| Expansion Coefficient ($\times 10^{-7}/°$ C.) | 83 | 83 | 83 |

The importance of photosensitive glass composition on the properties of laminates comprising photosensitive glass surface layers is shown in part by the further composition examples set forth in Table IIA below:

TABLE IIA

|  | D | E |
|---|---|---|
| $SiO_2$ | 72.7 | 72.7 |
| $Na_2O$ | 18.3 | 18.5 |
| $Al_2O_3$ | 6.8 | 6.8 |
| ZnO | 5.0 | 5.0 |
| F | 2.5 | 2.5 |
| Br | 0.2 | 0.1 |
| Ag | 0.0012 | 0.005 |
| $CeO_2$ | 0.018 | 0.018 |
| $Sb_2O_3$ | 0.2 | 0.1 |
| SnO | — | 0.1 |

The glasses in Table IIA are representative of photosensitive glasses which are not suitable for use in the invention. Glass D does not give good coloration utilizing conventional coloration techniques when employed as a surface layer glass in accordance with the invention, because it contains insufficient silver for that purpose. Glass E is low in silver and is also too high in thermal expansion to provide a strong laminate.

The fabrication of laminated articles in accordance with the invention may be accomplished utilizing procedures such as described, for example, in U.S. Pat. No. 3,673,049 to Giffen et al. Briefly, such procedures comprise compounding and melting glasses for the core and surface layer portions of the laminate, uniting the molten glasses at flowing viscosity to form a laminated intermediate, e.g., laminated sheet, and then shaping the soft laminated sheet into a glass article of a selected shape prior to cooling to room temperature. The absence of defects at the interface between the core and surface layer of the laminated article, and the compressive stresses which are generated in the surface layer of the article as it is cooled from the setting point of the softest glass in the laminate to room temperature, provide the high mechanical strength which is observed.

The decoration of a laminate produced as described simply involves processing in accordance with methods known for use with photosensitive glass. As noted in the aforementioned U.S. Pat. No. 4,017,318 to Pierson and Stookey, the development of color in photosensitive glasses such as used in the present laminates can be accomplished by a combination of high energy irradiation and heat treatment steps. A suitable color development process comprises first irradiating the glass with intense ultraviolet light in regions where color development is desired, and then heating the glass article at a temperature between the transformation range and softening point of the photosensitive glass for a time at least sufficient to cause nucleation and crystal growth within the glass. The initial irradiation step largely determines the ultimate color developed in the glass, which color is apparently a function of the total flux of ultraviolet light received (the product of light intensity and exposure interval). The subsequent heat treatment step initiates crystals growth in the glass and can be extended if a colored opal glass rather than a colored clear glass is desired.

Following the first irradiation and heat treatment steps, at least the regions of the photosensitive surface layer to be decorated are again irradiated with ultraviolet light and the article is again heated to a temperature above the transformation range but below the softening point of the photosensitive glass to promote the precipitation of metallic silver therein. The main effect of these subsequent irradiation and heat treatment steps is to fully develop and intensify within the glass the particular hue dictated by the initial irradiation step.

Close examination of the colored regions of photosensitive glasses of the described type has revealed the presence of microcrystals of alkali metal fluoride and metallic silver therein. The coloration observed has not been fully explained, but is thought to be due to the presence in the colored regions of discrete colloidal particles of metallic silver less than about 200Å in the smallest dimensions and/or metallic silver contained within a portion of the alkali metal fluoride microcrystals, the silver-containing portion of the microcrystals being less than about 200Å in the smallest dimension, and/or a coating of metallic silver on at least a portion of the surface of the alkali metal fluoride microcrystals, the portion of the microcrystals coated with silver being less than about 200Å in the smallest dimension.

The exact color developed within a selected portion of the photosensitive surface layer of a laminate provided in accordance with the invention depends upon the composition of the glass as well as on the particular sequence of irradiation and heat treatment steps employed, but suitable processing procedures may readily be determined by routine experiment. A variety of processing techniques are described in the aforementioned U.S. Pat. No. 4,017,318 to Pierson and Stookey and that patent is expressly incorporated herein by reference for a further discussion of the manufacture and treatment of photosensitive glasses.

The invention may be further understood by reference to the following detailed example.

EXAMPLE

A melt for a spontaneous opal core glass having a composition consisting, in parts by weight as calculated from the batch, of about 75.7 parts $SiO_2$, 6.23 parts $Al_2O_3$, 16.37 parts $Na_2O$, 1.25 parts $K_2O$, 4.57 parts F, and 0.17 parts CaO is provided. Glass of this composition has an average linear coefficient of thermal expansion (0°-300° C.) of about $94 \times 10^{-7}/°$ C.

A second melt for a photosensitive surface layer glass is also provided, this melt having a composition, in parts by weight as calculated from the batch, of about 72.0 parts $SiO_2$, 16.2 parts $Na_2O$, 6.9 parts $Al_2O_3$, 5.0 parts ZnO, 2.5 parts F, 1.1 parts Br, 0.01 parts Ag, 0.05 parts $CeO_2$, 0.20 parts $Sb_2O_3$ and 0.05 parts SnO. Glass of this composition has an average linear coefficient of thermal expansion (0°-300° C.) of about $83 \times 10^{-7}/°$ C.

The two melts are combined at a temperature of approximately 1200° C. to provide laminated glass ribbon approximately 0.100 inches in thickness and 3 inches in width, consisting upon cooling of a dense, white opal glass core completely enveloped by a transparent photosensitive glass skin about 0.010 inches in thickness.

A section of glass ribbon about 6 inches in length is cut from the ribbon thus provided and processed to photographically develop color therein. Three selected regions of one side of the ribbon, designated as regions 1, 2, and 3, are chosen for the development of green, red and yellow coloration respectively. The ribbon is positioned approximately 10 inches from a 200-watt mercury arc lamp, and the selected regions are irradiated so that region 1 is exposed to full lamp intensity for 20 seconds, region 2 is exposed for 45 seconds, and region 3 is exposed for 225 seconds.

The irradiated ribbon is then placed in an electric furnace, heated at a rate of about 450° C. per hour to a temperature of about 520° C., held at 520° C. for about 60 minutes, and then cooled to room temperature. Examination of the heat-treated ribbon indicates that the photosensitive skin remains transparent, although the irradiated regions exhibit a slight yellow tint.

The ribbon is then placed on a hot plate and heated to a temperature of about 300° C., maintained at 300° C. for a 30-minute interval during which it is uniformly irradiated with the mercury arc lamp above described. Irradiation is then terminated and the ribbon is cooled to room temperature.

Examination of the ribbon so treated shows that three intensely colored regions, contrasting strongly with the surrounding white color of the opal core, have been provided. Region 1, which was initially irradiated for 20 seconds with the mercury arc lamp, exhibits a bright green color, while regions 2 and 3, irradiated for 45 and 225 seconds, exhibit red and yellow colors, respectively. This decorated laminated ribbon has a modulus of rupture strength (abraded) of about 20,000 psi, which is sufficient to provide excellent resistance to mechanical breakage.

From the foregoing description it is apparent that a wide variety of decorated laminated glass articles useful for many technical and consumer-related applications requiring strength, light weight, and a flexible design capability may be provided within the scope of the invention as defined by the appended claims.

We claim:

1. An integrally colored laminated glass article consisting of a tensilely stressed core layer composed of a spontaneous opal core glass of alkali aluminosilicate composition and a compressively stressed surface layer fused to and substantially enveloping said core layer composed of a surface layer glass having at least one integrally colored region containing microcrystals of alkali metal fluoride and a coloring metallic silver phase, wherein:
   (a) the ratio of the thickness of said core layer to the thickness of said surface layer is at least about 8:1;
   (b) the thickness of said surface layer is at least about 0.002 inches;
   (c) the core glass has an average linear coefficient of thermal expansion (0°-300° C.) of at least about $75 \times 10^{-7}/°$ C.;
   (d) the surface layer glass has an average linear coefficient of thermal expansion (0°-300° C.) which is at least $10 \times 10^{-7}/°$ C. less than that of the core glass;
   (e) the surface layer glass contains at least about 0.01% silver by weight;
   (f) the core glass is essentially free of $Li_2O$; and
   (g) the integrally colored region of the surface layer glass contains microcrystals of alkali metal fluoride in a concentration of at least 0.005% by volume and further contains:
     (i) discrete colloidal particles of metallic silver less than about 200Å in the smallest dimension and/or
     (ii) metallic silver contained within at least a part of said alkali metal fluoride microcrystals, said silver-containing part of the microcrystals being less than about 200Å in the smallest dimension and/or
     (iii) a coating of metallic silver on at least a portion of the surface of the alkali metal fluoride microcrystals, the portion of the microcrystals coated with silver being less than about 200Å in the smallest dimension.

2. A laminated glass article in accordance with claim 1 wherein the core glass has a composition comprising, in weight percent as calculated from the batch, about 57–76% $SiO_2$, 5–11% $Al_2O_3$, 5–17% $Na_2O$, 0–3% $K_2O$, and 4–10% F.

3. A laminated glass article in accordance with claim 1 wherein the core glass has an average linear coefficient (0°–300° C.) of thermal expansion in the range of about 85–95 × $10^{-7}$/° C.

4. A laminated glass article in accordance with claim 1 wherein the surface layer glass has a composition consisting essentially, in weight percent as calculated from the batch, of about 68–74% $SiO_2$, 14–18% $Na_2O$, 4–10% $Al_2O_3$, 3–9% ZnO, 1.8–6% F, 0.1–2.5% Br, 0.01–0.05% Ag, 0.01–0.10% $CeO_2$, 0.05–3.0% $Sb_2O_3$, and 0.04–0.2% SnO.

5. A method for producing an integrally colored laminated glass article consisting of a tensilely stressed core layer composed of a spontaneous opal core glass of alkali aluminosilicate composition and a compressively stressed surface layer fused to and substantially enveloping said core layer composed of a surface layer glass having at least one integrally colored region containing microcrystals of alakli metal fluoride and a coloring metallic silver phase, which method comprises the steps of:
   (a) providing a first melt of an alkali aluminosilicate core glass having an average linear coefficient of thermal expansion (0°–300° C.) of at least about 75 × $10^{-7}$/° C. and a composition which is essentially free of $Li_2O$, the viscosity of said first melt being in the range of about 400–4000 poises;
   (b) providing a second melt of a photosensitive surface layer glass having an average linear coefficient of thermal expansion (0°–300° C.) which is at least about 10 × $10^{-7}$/° C. less than that of the core glass and a composition which includes at least about 0.01% silver by weight, the viscosity of said second melt being in the range of about 700–3000 poises;
   (c) combining the first and second melts into laminated glass sheet and shaping the sheet to provide a laminated glass article comprising a core layer and a photosensitive surface layer, the ratio of the thickness of the core layer to the thickness of the surface layer being at least about 8:1 and the thickness of the surface layer being at least about 0.002 inches;
   (d) developing selected regions of the photosensitive surface layer into integrally colored regions, said regions containing microcrystals of alkali metal fluoride in a concentration of at least about 0.005% by volume and further containing:
      (i) discrete colloidal particles of metallic silver less than about 200Å in the smallest dimension and/or
      (ii) metallic silver contained in at least part of said alkali metal fluoride microcrystals, said silver-containing part of the microcrystals being less than about 200Å in the smallest dimension and/or
      (iii) a coating of metallic silver on at least a portion of the surface of the alkali metal fluoride microcrystals, the portion of the microcrystals coated with silver being less than about 200Å in the smallest dimension.

6. A method in accordance with claim 5 wherein the core glass has a composition comprising, in weight percent as calculated from the batch, of about 57–76% $SiO_2$, 5–11% $Al_2O_3$, 5–17% $Na_{22}O$, 0–3% $K_2O$ and 4–10% F.

7. A method in accordance with claim 5 wherein the core glass has an average linear coefficient of thermal expansion (0°–300° C.) in the range of about 85–95 × $10^{-7}$/° C.

8. A method in accordance with claim 5 wherein the surface layer glass has a composition consisting essentially, in weight percent as calculated from the batch, of about 68–74% $SiO_2$, 14–18% $Na_2O$, 4–10% $Al_2O_3$, 3–9% ZnO, 1.8–6% F., 0.1–2.5% Br, 0.01–0.05% Ag, 0.01–0.10% $CeO_2$, 0.05–3.0% $Sb_2O_3$, and 0.04–0.2% SnO.

* * * * *

UNITED STATES PATENT AND TRADEMARK OFFICE
CERTIFICATE OF CORRECTION

PATENT NO. : 4,130,680
DATED : December 19, 1978
INVENTOR(S) : Joseph Ference and John E. Megles, Jr.

It is certified that error appears in the above-identified patent and that said Letters Patent are hereby corrected as shown below:

Column 2, line 36, "silvercontaining" should be -- silver-containing --.

Column 10, Claim 6, line 29, "$Na_{22}O$," should be -- $Na_2O$, --.

Signed and Sealed this

Thirty-first Day of July 1979

[SEAL]

Attest:

LUTRELLE F. PARKER
Attesting Officer    Acting Commissioner of Patents and Trademarks